March 4, 1941. F. B. LLEWELLYN Re. 21,739

SPACE DISCHARGE APPARATUS

Original Filed Jan. 23, 1936 2 Sheets-Sheet 1

INVENTOR
F. B. LLEWELLYN
BY J. A. Burgess
ATTORNEY

March 4, 1941. F. B. LLEWELLYN Re. 21,739

SPACE DISCHARGE APPARATUS

Original Filed Jan. 23, 1936 2 Sheets-Sheet 2

INVENTOR
F. B. LLEWELLYN
BY H. A. Burgess
ATTORNEY

Reissued Mar. 4, 1941

Re. 21,739

UNITED STATES PATENT OFFICE 21,739

SPACE DISCHARGE APPARATUS

Frederick B. Llewellyn, Verona, N. J., assignor to Bell Telephone Laboratories, Incorporated, New York, N. Y., a corporation of New York Original No. 2,096,460, dated October 19, 1937, Serial No. 60,403, January 23, 1936. Application for reissue April 15, 1939, Serial No. 268,101

21 Claims. (Cl. 250—36)

The present invention relates to ultra-high frequency circuits employing space discharge apparatus for amplification, oscillation production or kindred purposes.

A general object of the invention is to secure a useful cooperative relation between electrons traversing a given path at given velocity and an alternating current field along the path, the wave-length of which is suitably related to the electron velocity.

A further object is to produce an electric force which moves along with the electron and acts on the electron in the same direction at all times.

The useful cooperative relation may, as one example, be such that energy is delivered by the moving electrons to the circuit by which the alternating current field is produced. Conversely, the field may be used to exert forces on the electron stream for the purpose of producing amplified oscillations in a circuit in which the electron stream controls a current flow.

In one specific form of embodiment to be described, a cylindrical tube has electrodes for producing electron flow along its length and has a series of conducting surfaces spaced along the tube such that an electron traverses the distance from one conductor to the next in half a period of the oscillations that are being produced or utilized in the system. These conductors may be formed as the successive turns of a standing wave coil or may be so related to a standing wave coil that the phase reverses from each conductor to the next, considered along a line parallel to the axis of the tube. An electron entering the field of influence of the first conductor may, as one example, have such a phase relation as to impart an increment of energy to the standing wave circuit. The driving voltage on the tube sustains the velocity of the electron notwithstanding this delivery of some of its energy to the external circuit. By the time the electron has entered the field of influence of the next conductor of the standing wave circuit the phase relations have become identically the same as in the case of the first conductor and a further increment of energy is delivered to the external circuit. This action continues throughout the journey of the electron along the tube.

For amplification a somewhat converse action may be secured by causing the energy in the standing wave circuit to drive electrons alternately toward separate anodes and produce amplified oscillations in the circuit connected to these anodes.

The various objects and features of the invention will be more fully understood from the following detailed description of certain illustrative embodiments as shown in the accompanying drawings.

Figure 1:
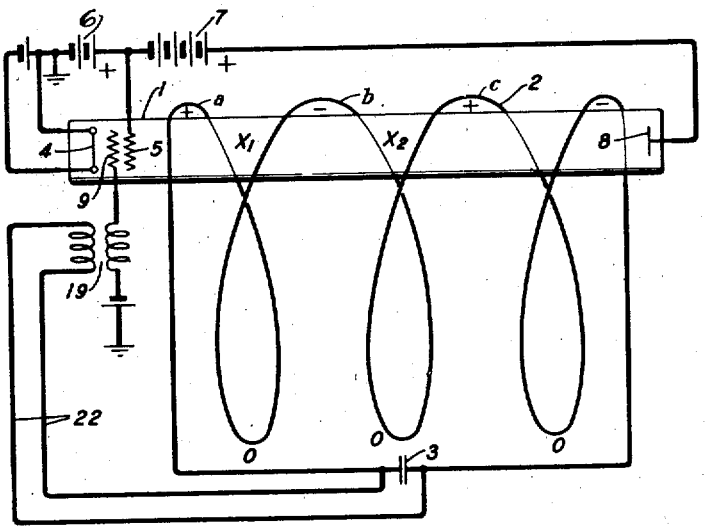
Fig. 1 is a schematic diagram of a circuit embodying the invention in one form of oscillation generator.

In Fig. 1 an evacuated tube 1 is provided with a cathode 4, grid 5 biased positive by battery 6, and anode 8 at still higher positive potential than the grid as determined by battery 7. Coil 2 surrounds the tube 1 although it could be placed altogether or in part inside the tube if a suitable bias voltage were maintained on it. The coil may be self-tuned or tuned by a condenser 3. The condenser 3 or coil 2 or both may constitute a radiator of waves produced by the circuit.

In operation, the grid and anode are given such voltages that electrons emitted at 4 travel down the tube toward the anode 8 at suitable velocity. Assume a transient in coil 2 of such frequency that the phase in adjacent turns $a$ and $b$ is opposite. An electron at $x_1$, between the turns experiences a retarding force and delivers an increment of energy to the coil in a direction to sustain the transient. With a proper spacing of turns relative to the electron velocity and frequency of oscillation of the circuit 2, 3, it is apparent that the phase between $b$ and $c$ when the electron passes the point $x_2$ may be such that a further increment of energy is abstracted from the electron by the coil 2 in a direction to sustain the transient. The condition for this to happen is that points $a$ and $b$ on coil 2 shall have opposite phase and that the distance between turns is equal to the distance traversed by the electron in half the period of oscillation of the circuit 2, 3. Under these conditions electrons entering the influence of the coil 2 a half cycle later than the one just described will be acted upon by accelerating forces; and hence will abstract energy from the transient and thus produce a tendency for it to die out. This tendency is counteracted, however, by the fact that the accelerating forces cause the electrons to speed up and hence catch up with the electrons from the preceding half cycle which are in the proper phase to deliver energy to the transient. The tendency to absorb energy may further be reduced by varying the relative number of electrons emitted during successive half cycles. This may be accomplished by coupling a portion of the energy from the coil 2 to a grid 9 provided with suitable bias potential. A means of doing this is shown at 19 as an inductive coupling to a grid from the output circuit by way of leads 22. This coupling and grid are optional. Whether or not this feed-back is employed, oscillations are produced in the circuit 2, 3 and can be utilized in any suitable way, as by coupling the circuit 2, 3 to a load or using it as a radiator.

The assumption made above that points *a* and *b* are at opposite phase is realized in the case where standing waves are produced in coil 2 with nodal points of potential at 0, 0. In any one turn, the voltage at all points above the point 0 in the figure is in the same phase but differs in amplitude along the wire, being a maximum at the uppermost point such as *a*. In the next turn at the same instant of time the field at all points above the point 0 in the figure is of opposite phase to that of the first turn, and so on.

Figure 1A:
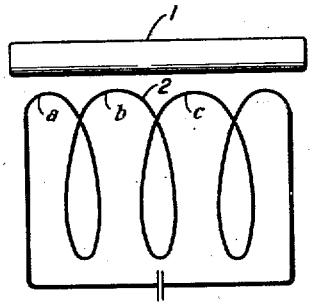
Fig. 1A is an alternate form of the circuit of Fig. 1.

In order that the electrons experience forces from the individual turns of the coil 2 rather than the mean effect of the coil as a whole, it is necessary that the shortest distance between the electron stream and a given turn shall be at most not much greater than the distance between turns. In Fig. 1 this is provided by making the glass envelope 1 of the tube as small in diameter as may be and by placing it as close to the periphery of the coil as possible. While Fig. 1 shows the tube located inside of the coil, this is a matter of convenience and the tube may optionally be positioned just outside rather than just inside of the coil, as indicated schematically in Fig. 1A, which shows the tube at 1 and the coil at 2.

Figure 2:
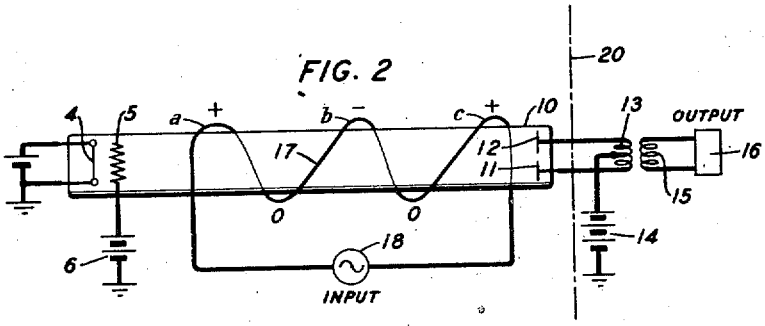
Fig. 2 is a similar diagram of the invention applied to an amplifier.
Figure 2A:
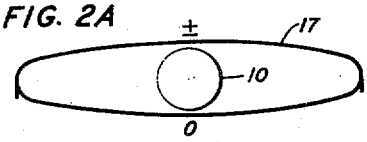
Fig. 2A is an end-view detail of Fig. 2.

In Fig. 2 a tube 10 is assumed similar to tube 1 except that it is provided with two anodes 11 and 12 connected to opposite ends of a primary winding 13, the center of which is connected to space voltage source 14. The secondary 15 leads to any suitable load 16. Elements 4, 5 and 6 may be the same as in Fig. 1. The winding 17 is in this figure an input coil connected to an input source 18 of ultra-high frequency waves to be amplified. The effective length of each turn of wire in the coil is half a wave-length and the spacing between turns is such that an electron requires half a period to traverse the distance from turn to turn. To accomplish this, the cross-section of the coil may be made elliptical in shape as shown in section in Fig. 2A where 10 represents the tube and 17 the coil. At a given instant, the potential distribution along the coil will be as shown by the (+) and (—) signs in Fig. 2.

Consider initially two electrons that started out at different times such that one of them has arrived at a point under *a* at the same instant that the other has reached a point under *b*, the potential distribution at that instant being as represented. The electron under *b* will be deflected (say) downward, while that under *a* will be deflected upward. A half period later the first electron will be under *c* which is then minus and will be further deflected downward. The second electron will, at that instant, have reached *b* which is then positive and will be further deflected upward. Each turn of the coil acts on these two electrons to augment their initial deflection in the same direction with the result that one is driven against anode 11 and the other against anode 12. From the course of these two electrons it is seen that in reality the electron stream is made to oscillate up and down at the frequency of the standing wave in coil 17 and to impinge alternately on the anodes 11 and 12, thus setting up an amplified output wave in the utilization circuit 15, 16. The output may be shielded from the input as indicated by shield 20 which may be considered as enclosing to a sufficient extent the part of the apparatus to the right or to the left of the line at which it is shown in the figure. Thus, an amplifier without feed-back is secured.

Figure 3:
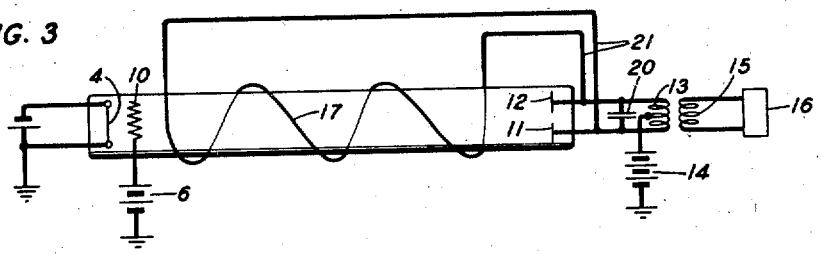
Fig. 3 shows an alternative form of oscillation generator embodying the invention.

An apparatus similar to that of Fig. 2 but provided with feed-back for the generation of oscillations is shown in Fig. 3. In this figure the various elements of the circuit of Fig. 2 can be identified by the use of similar reference characters. The source of waves 18, is, however, omitted and in its stead the terminals of coil 17 are connected across the anodes by leads 21. A tuning condenser 20 may be used.

The operation is essentially the same as that of the Fig. 2 circuit, except that the wave producing the field in coil 17 is obtained from the output instead of from an external source. A transient in the output circuit or in coil 17 may be assumed to deflect electrons toward anode 11 or 12 and produce a current change in the anode circuit which is in a direction to sustain the transient and, because of the amplifying action, to augment the original transient effect. Oscillations, therefore, build up to a value determined by the gains and losses in the system as in the case of the usual oscillator.

Figure 4:
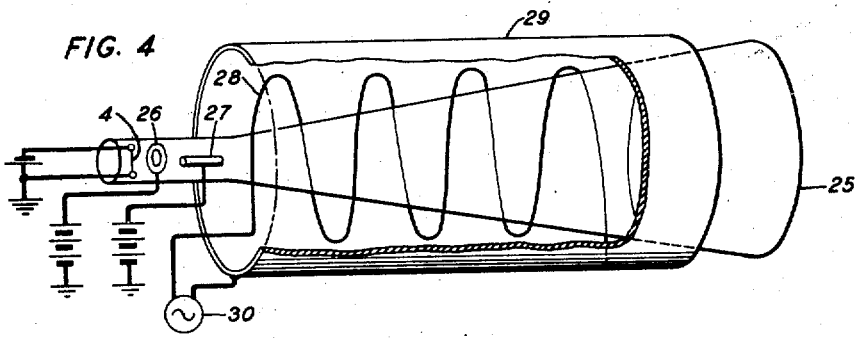
Fig. 4 shows the invention applied to an oscillograph tube.

In Fig. 4 the oscillograph tube 25 may be of usual type suitably rendered luminescent over its larger end and provided with the usual cathode 4, accelerating and concentrating electrodes 26, 27. Coil 28 surrounds the tube and may be shielded from external fields by copper cylinder 29 which may conveniently form one terminal of the coil. A similar shield can be used for the coils shown in Figs. 1, 2 and 3 if desired. In one vase the coil 28 had a diameter of 4.5 inches and a distance between turns of 0.49 inch. The source 30 was an oscillator of 72 centimeter wave-length. Each turn of coil 28 was, therefore, half a wave-length. The spot at the center of the screen changed, upon application of the waves to coil 28 from source 30, to a straight line which became as long as 1½ inches even with the application of quite weak oscillations. Varying the strength of the applied oscillations varied the length of the image line. The anode-cathode voltage on the cathode-ray tube for the straight line pattern was 300 volts. Changing the voltage successively to 275 and to 250 produced a rotation of the image and changed it from a line to an ellipse of successively greater minor axis. The existence of the straight line pattern showed that at 300 volts potential the electron travel in half a period was the distance from one turn to the next. Standing waves were being produced with the nodal and anti-nodal points diametrically opposite each other on a diameter of the same angular position as the line pattern.

Figure 5:
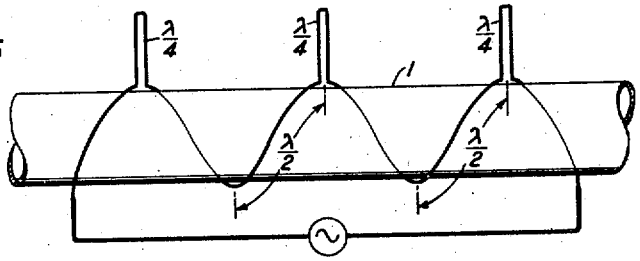
Figs. 5 to 7 show various winding modifications.

The condition stated in connection with Fig. 1 was that the wave in any one complete turn was in the same phase and that there was a phase reversal from turn to turn. In a coil wound as in Fig. 1, this condition imposes a limit on the diameter of coil and tube that can be used. Various expedients can, however, be employed to relieve this restriction. In Fig. 5, for example, a coil having a circumference equal to a whole wave-length is shown. The first half of a given turn carries a current of a given phase. At the end of the half turn a loop of half a wave-length is introduced so that the current of the opposite phase is carried in the loop. The other half-turn, therefore, carries current in the same phase as the first half-turn. By including one phase-reversing loop per turn, as shown, the phase in each turn is kept the same but is reversed from one turn to the next.

Figure 6:
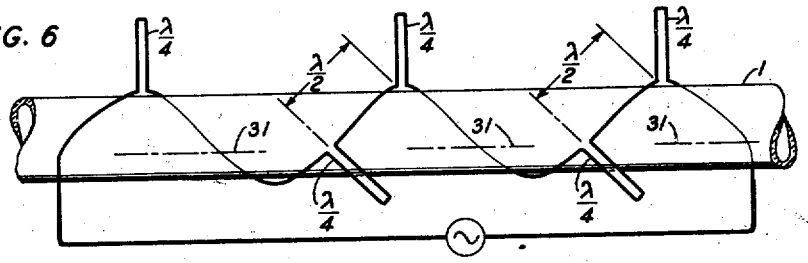

In Fig. 6, a similar construction is used except that each turn is one and a half wave-lengths in circumference. The broken line 31 is the line of potential nodes. Starting from this line and following around any complete turn, it will be seen that each third of the turn represents a half cycle of the same sign with the intervening two phase-reversing loops.

Figure 7:
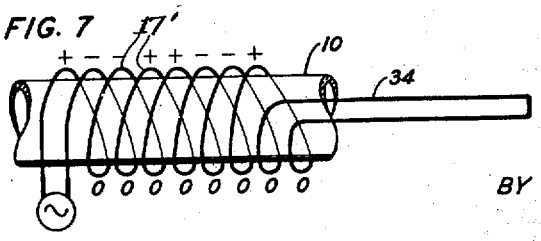

Fig. 7 shows a winding structure which is a modification of that shown in Fig. 2. Instead of winding the coil as a single wire as in the case of coil 17 of Fig. 2, the coil may consist of a pair of wires wound as a pair into a coil 17′ and ending in a short-circuited Lecher wire 34. With this type of winding, the circumference of the coil is a half wave-length long (as in Fig. 2) but the distance an electron must travel to realize the action described with reference to Fig. 2 is twice the distance between turns. The distribution of potentials along the coil is as shown by the plus and minus signs.

With the examples that have been given of preferred forms of embodiment, various modifications will naturally suggest themselves to those skilled in the art, and it is intended that the invention is not to be limited to the specific forms disclosed but only by the scope of the claims.

What is claimed is:

1. The combination of a space discharge tube having a cathode, an anode and a source of anode voltage, of a coil surrounding the space traversed by electrons between the cathode and anode, and having its axis in the direction of the electron travel, means producing standing waves in said coil, the frequency of which is related to the coil dimensions such that alternate turns of the coil carry currents of opposite phase, and the spacing of coil turns being related to the electron velocity such that an electron travels the distance from one turn to the next in half a period of the waves in said coil.

2. The combination specified in claim 1, said tube having a pair of anodes spaced from each other at the end of the tube opposite the cathode, a work circuit differentially connected to said anodes, and a source of input waves connected to said coil.

3. The combination specified in claim 1, in which a pair of anodes is provided at the anode end of the tube, a work circuit differentially connected to said anodes, and a feed-back connection from said work anodes to said coil to enable the production of sustained oscillations.

4. The combination comprising an elongated tube having a cathode at one end and an anode at the opposite end, means including a source of potential for imparting velocity to electrons down the tube toward the anode, a coil surrounding the electron path within the tube, means producing standing waves in said coil of a wave-length to cause a turn-to-turn reversal of phase in the coil, and the distance between turns being related to the velocity of electrons in the tube to cause an electron to deliver energy to turn after turn of the coil in phase relation such as to tend to sustain the waves in the coil.

5. An amplifier comprising an elongated tube having a cathode near one end and anodes near the other end, means to impart velocity to the electrons down the tube toward the anodes, a coil surrounding the path of electron travel within the tube, a source of input waves connected to said coil, the frequency of said waves, the diameter of the coil, the spacing between turns and the electron velocity being all related such that a given electron in the electron stream is acted on similarly by each successive turn of the coil and the stream is deflected alternately to and away from one or more of said anodes, and an output circuit connected to said anodes.

6. In an electronic device, means defining a space path, means including an electron source, an electrode and means for making the potential of the electrode positive with respect to the electron source for causing electrons to traverse said space path, circuit means setting up a standing wave field with a component of electric intensity in the direction to produce accelerating and retarding effects on electrons along their path of travel, said field extending more than one wave-length along said path, the wave-length of said field being related to the velocity of said electrons to produce alternately retarding and accelerating effects on said electrons in alternate half periods in such manner as to cause the accelerated electrons to tend to overtake the retarded electrons, in their travel along said space path, in proper phase to deliver cumulative energy to said circuit means and means for utilizing the cumulative energy so delivered.

7. In an electronic device, an electron source, means including an element and a source of voltage for making the potential of the element positive relative to said source for causing electrons to traverse a space path, means producing a high frequency field in the initial portion of said space path having an electric component in the direction to produce retarding and accelerating effects on electrons along the path of travel of said electrons, external circuit means producing a high frequency field in a subsequent portion of said space path having an electric component in the direction to produce retarding and accelerating effects on electrons along the path of travel of said electrons, said field in said initial portion of said space path alternately accelerating and retarding electrons in successive half periods to cause the accelerated electrons in their subsequent travel along said space path to tend to overtake the retarded electrons whereby they arrive in the region of said subsequent portion in proper phase with respect to said field to deliver energy to said external circuit means.

8. In an electronic device, means providing a space path, a source of electrons, a conducting member having means positively charging the member for causing electrons to traverse said space path, means producing in an initial portion of said space path a high frequency field having an electric component in such direction that said field alternately accelerates and retards electrons traversing said portion, in successive half periods of said field, to cause the accelerated electrons to tend to overtake the retarded electrons in their subsequent travel along said path, and means producing an alternating field having an electric component tending to retard said electrons at a portion of said space path where said accelerated and previously retarded electrons are in substantially the same phase, for abstracting energy from said accelerated and previously retarded electrons.

9. In an electronic device, means providing a space path, a source of electrons, an electrode and means for positively charging the electrode for imparting velocity to the electrons and causing them to traverse said space at suitable velocity, means providing between two points in an initial portion of the path a high frequency alternating field exerting alternately retarding and accelerating effects on electrons between said points in alternate half periods of said field whereby increments of energy are alternately given to and abstracted from the field in this region, and means providing similar field conditions further on along the path of electron travel at a point where the accelerated electrons have sufficiently caught up with the retarded electrons, and are in proper phase, to deliver energy to the field.

10. In ultra high frequency electronic apparatus, an evacuated enclosure, means providing a space path for electron travel therein, a source of electrons, means producing an ultra high frequency electric field which has in each of a succession of regions spaced along said path of electron travel an electric component in such direction as to affect the velocity of electron travel, means for causing electrons from said source to enter the influence of said field and to traverse said space at suitable velocity, whereby electrons in an initial region of said field are retarded in one half period and accelerated in the next half period, and means maintaining the field and electron velocity relations such that those electrons which were retarded in said initial field region and also those electrons which in the next half period were accelerated in said initial field region both deliver energy to the field in a further region along the path of electron travel where the accelerated electrons have sufficiently caught up with the electrons which entered the initial region a half period earlier and where retarded.

11. In ultra high frequency electron apparatus, a source of electrons and an electrode for defining a path of electron travel, means making the potential of said electrode positive with respect to said source, means producing an ultra high frequency field having in a region between two given points along said path an electric component of intensity in the direction to produce retarding and accelerating effects on electrons travelling along said path, whereby said field tends to accelerate electrons in half periods of one phase and to retard electrons in the half periods of opposite phase, the accelerating action tending to absorb energy from said field, and means to reduce the tendency for such energy absorption from said field comprising electrode means ahead of said region for reducing the number of electrons entering said region in the electron accelerating phase of said field in comparison with the number entering said region in the electron retarding phase.

12. In an electronic device, means comprising a source of electrons and an electrode defining a space path for the traverse of electrons, means making the potential of said electrode positive relative to said source, means producing an ultra-high frequency field having in a given region in said path a component of electric intensity in the direction to affect the velocity of electron travel along said path whereby electrons in said region are accelerated in one phase of the field and are retarded in another phase of the field so that said electrons are given different relative velocities in their movement toward said positive potential electrode, an output circuit, means including said electrode for impressing on said output circuit the cumulative energies of said accelerated and retarded electrons and feedback connections from said output circuit to the means producing said ultra-high frequency field, said connections supplying the energy for said field from said output circuit.

13. In electronic apparatus, an elongated evacuated tube, a cathode and positive accelerating electrode at one end, a positive electrode at the opposite end, with an intervening elongated space path for the travel of electrons, means for making the potential of said electrodes positive, spaced conductor means producing ultra high frequency fields at discrete regions spaced apart along said path, said fields having electric intensity components in the direction of electron travel, and means so relating the frequency and phase of said field components and the velocity of the electrons that electrons which are retarded in an earlier of said regions are also retarded in a subsequent region and deliver energy to the field in both of said regions, and electrons which are accelerated in said earlier region catch up sufficiently with the electrons of the preceding half cycle, which were retarded, to be in proper phase in such subsequent region to experience retardation and deliver energy to the field in said subsequent region.

14. In a high frequency wave generating system, a source of electrons, means for accelerating the electrons and for causing them to traverse a path the length of which is more than one wave-length of the generated waves, a conducting system associated with the path so positioned with respect thereto as to be subjected to induced electromotive forces engendered by the transit of electrons along the path, the conducting system having such an electrical length along its exposure to the path that an electron which yields energy to the conducting system at any point in its transit will continue to yield energy thereto during its transit along the conducting system and a load circuit coupled to said conducting system for utilizing the yielded energy.

15. In a space discharge device, means including a source of electrons and a positive electrode spaced therefrom for producing electron travel across the intervening space, means for making the potential of said electrode positive with respect to said source, conductor means having portions spaced along the direction of electron travel and forming part of a system resonant at an ultra high frequency, means causing alternate portions of said conductor to have opposite potentials at a given instant such as to set up electric fields in the regions between the alternate conductor portions in such directions, at a given instant, as alternately to retard and accelerate electrons that are traversing those regions, said potentials and said fields alternating in sign at the resonant frequency and means for producing waves of said ultra-high frequency in said resonant system comprising means so relating the spacing between the conductor portions and the means determining the velocity of electron travel that electrons which were retarded and accelerated in opposite half periods of said waves in an earlier one of said regions both appear in a subsequent one of said regions in proper phase to deliver energy to said resonant system 16. The process which comprises subjecting an electron stream at a point along its course to an accelerating force and to a retarding force in periodic alternation while permitting both the accelerated and the retarded electrons to pass said point and subsequently deriving energy from the stream at another point further along in its course where accelerated electrons tend to overtake retarded electrons and both are in proper phase to deliver energy to the adjacent electric field, all of said electrons passing said two points in the same direction.

17. The method of generating and amplifying a high frequency wave comprising subjecting a stream of electrons, initially continuous, to a high frequency alternating electric field, causing said field in a given region alternately to decelerate and accelerate electrons in said stream to produce a redistribution of the positional relations of the electrons lengthwise of the stream while allowing both the decelerated and accelerated electrons to traverse said region in the same direction and abstracting energy into said field from said stream at a point further along the stream where previously accelerated electrons tend to overtake decelerated electrons and both are in a retarding phase of said field and are traveling in said same direction.

18. The method of generating electrical oscillations which comprises subjecting an electron stream at a point along its course to alternately accelerating and retarding forces to produce in electrons passing such point in succeeding half periods differential velocities whereby the accelerated electrons tend to overtake the retarded electrons, and abstracting energy from said electrons at another point further along in their path of travel at which both the previously accelerated and retarded electrons are in similar phase, all of said electrons passing both of said points in the same direction.

19. In electronic apparatus, electron producing means, a target, means positively charging said target, conducting members at spaced points along the discharge path for producing an oscillating electric field more than a wave-length long in the space between said electron producing means and said target, the spacing between said conducting members and the velocity of the electrons and the frequency of said field all being so related as to cause a given electron to react to the field similarly in successive half periods and to cause electrons in the space between two adjacent conducting members to be alternately accelerated and retarded by said field in successive half periods, whereby electrons so accelerated tend to overtake electrons that were so retarded in the previous half period, in proper phase in a subsequent space between certain of said spaced conducting members to deliver energy to said field and means between said electron producing means and the first of said conducting members to vary the number of electrons passing from said electron producing means into the influence of said field in definite relation to the periodicity of the field.

20. In an electric discharge system comprising a source of electrons, electrode means and means making the potential of the electrode means positive with respect to said source for causing electrons from the source to traverse a path the length of which exceeds the distance through which an electron travels during a cycle of a desired high frequency oscillation, and means adjacent the path to vary at the desired oscillation frequency the number of electrons which are passing a given point in the path, whereby the resultant electron stream consists of regions of alternately greater and less electron density spaced apart along the length of the stream by half the distance of the mean electron travel during a cycle of said high frequency and circuit means resonant at said high frequency for abstracting energy from said greater density portions of said electron stream.

21. In high frequency wave generation in which the electric wave is produced in a conductor disposed adjacent to an electron stream, the method comprising subjecting said stream to the electric field throughout more than the distance of travel of electrons along said stream in one full period of said wave, causing said field alternately to retard and accelerate electrons in an initial portion of the stream, whereby the accelerated electrons tend to overtake the retarded electrons and subsequently supplying increments of energy to said field from both the overtaking and the overtaken electrons at a point along the stream and conductor where the electric field is in such phase as to exert a retarding force upon both said overtaking and overtaken electrons.

FREDERICK B. LLEWELLYN.